(12) United States Patent
Shnitser et al.

(10) Patent No.: US 10,207,410 B1
(45) Date of Patent: Feb. 19, 2019

(54) ROBOTIC AUTONOMOUS NAVIGATION AND ORIENTATION TRACKING SYSTEM AND METHODS

(71) Applicant: Physical Optics Corporation, Torrance, CA (US)

(72) Inventors: Paul Shnitser, Irvine, CA (US); David Miller, San Pedro, CA (US); Christopher Thad Ulmer, San Pedro, CA (US); Volodymyr Romanov, Redondo Beach, CA (US); Victor Grubsky, Porter Ranch, CA (US)

(73) Assignee: Physical Optics Corporation, Torrance, CA (US)

( * ) Notice: Subject to any disclaimer, the term of this patent is extended or adjusted under 35 U.S.C. 154(b) by 128 days.

(21) Appl. No.: 15/267,045

(22) Filed: Sep. 15, 2016

Related U.S. Application Data

(60) Provisional application No. 62/276,128, filed on Jan. 7, 2016.

(51) Int. Cl.
| | | |
|---|---|---|
| *G01C 3/08* | (2006.01) | |
| *B25J 9/16* | (2006.01) | |
| *B25J 13/08* | (2006.01) | |
| *G05D 1/02* | (2006.01) | |

(52) U.S. Cl.
CPC .......... *B25J 9/1697* (2013.01); *B25J 13/089* (2013.01); *G05D 1/0231* (2013.01); *G05D 2201/0218* (2013.01)

(58) Field of Classification Search
CPC .. G01B 11/2518; G01B 11/2527; G01B 9/02; G01B 11/005; G01B 11/03; G01C 3/08; G01S 17/48; G01S 17/89; G01S 7/484; G01S 7/486; G01S 1/02; G01Q 10/00; G01Q 10/045; G01Q 20/02; B64C 17/00; B64C 39/022; B64C 39/024; B64C 39/028
USPC ................ 700/259; 850/1, 6; 342/179, 25 B; 250/216; 382/206
See application file for complete search history.

(56) References Cited

U.S. PATENT DOCUMENTS

| | | | |
|---|---|---|---|
| 9,607,239 B2 * | 3/2017 | Bridges ................ | G06K 9/4604 |
| 2009/0046895 A1* | 2/2009 | Pettersson ............ | G01B 11/005 382/106 |
| 2014/0071460 A1* | 3/2014 | Suzuki ................... | G01B 5/008 356/614 |

* cited by examiner

*Primary Examiner* — Dalena Tran
(74) *Attorney, Agent, or Firm* — Sheppard Mullin Richter & Hampton LLP

(57) ABSTRACT

A system and apparatus for navigating and tracking a robotic platform includes a non-contact velocity sensor module set positioned on the robotic platform for measuring a velocity of the robotic platform relative to a target surface. The non-contact velocity sensor module set may include a coherent light source that is emitted towards the target surface and reflected back to the coherent light source. Measuring the change in intensity of the reflected coherent light source may be used to determine the velocity of the robotic platform based on the its relationship with the principles of a Doppler frequency shift. A communication unit may also be utilized to transmit data collected from the non-contact velocity sensor set to a computer for data processing. A computer is then provided on the robotic platform to process data collected from the non-contact velocity sensor set. A user may then monitor the determined trajectory path of the robotic platform and transmit navigation instructions to the robotic platform based on the received trajectory path data.

22 Claims, 8 Drawing Sheets

ROBOTIC AUTONOMOUS NAVIGATION AND ORIENTATION TRACKING SYSTEM AND METHODS

TECHNICAL FIELD

The disclosed technology relates generally to the field of autonomous or semi-autonomous navigation. More specifically, embodiments disclosed herein relate to systems and methods for navigating and tracking robotic platforms.

BACKGROUND

Applications of robotic platforms are vast and limitless, as they can be assembled and programmed to perform a variety of tasks that may be difficult and even impossible for humans. For example, some of the most dangerous and challenging environments are found beyond Earth and on various planets in our Solar System, which make it difficult for scientists to learn and understand the scientific wonders of Space and life outside our planet Earth.

As a result, robotic platforms have been launched to the surface of various planets in our solar system to collect data that would otherwise be impossible by human effort alone. With the use of robotic platforms such as probes, landers, and rovers, such robotic platforms have been able to roam and explore the surface of extraterrestrial planets for extended periods of time and maneuvered by control stations located on Earth. However, controlling and navigating these robotic platforms are limited, and at times, a painstakingly slow process. For example, the National Aeronautics and Space Administration's Curiosity rover stationed on Mars has only able to travel a distance of approximately 660 feet per day. Some of the factors resulting in the slow navigation of the rover is a result of the round-trip communication latency of 20 minutes or more between Earth and Mars, as well as the limited technological advancements in the robotic platforms being able to avoid hazardous trajectories on their own. Such limited travel speeds is not sufficient for future space mission and is one of the limiting factors hindering robotic research capabilities.

BRIEF SUMMARY OF EMBODIMENTS

Some embodiments of the systems and methods disclosed herein can be configured to allow the navigating and tracking of robotic platforms with improved speed and accuracy in an infrastructure-free environment. According to various embodiments of the disclosed technology, the position and orientation of the robotic platform may be determined and monitored based on data acquired by a set of non-contact velocity sensors located on the robotic platform. The non-contact velocity sensor module set positioned on the robotic platform may be configured to measure the velocity of the robotic platform relative to a target surface. The non-contact velocity sensor module set may emit and reflect a laser beam from the target surface to determine the velocity of the robotic platform by measuring a change in intensity or frequency of the reflected laser beam.

The robotic platform may also include a computer for processing data collected from the non-contact velocity sensor set to determine a position and orientation of the robotic platform at each selected time interval based on the determined velocity. In further embodiments, a communication unit may also be included for transmitting data collected from the non-contact velocity sensor to the computer for data processing. The tracking system may also include a transceiver, which may be used to communicate with the robotic platform to receive data collected from the non-contact velocity sensor module set. This may allow a user to monitor a trajectory path of the robotic platform and transmit navigation instructions in response to the determined trajectory path of the robotic platform.

Additionally, embodiments of the disclosed technology may also include a method for tracking and navigating a robotic platform. The method may include obtaining a robotic platform with a non-contact velocity sensor module set for measuring a velocity of the robotic platform relative to a target surface. Further embodiments may include a robotic platform with a communication unit for transmitting data collected from the non-contact velocity sensor for data processing, and a computer for processing data collected from the non-contact velocity sensor set.

The method may also include emitting a laser beam from the non-contact velocity sensor module set to the target surface, and collecting a reflected laser beam from the target surface. The reflected laser beam may enter a laser cavity of the non-contact velocity sensor module set to determine a position and an orientation of the robotic platform based on a change in intensity of the reflected laser beam.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

According to various embodiments of the disclosed technology, the position and orientation of a robotic platform may be determined and monitored based on data acquired by non-contact velocity sensors located on the robotic platform sensor set as a whole. By way of example only, two non-contact velocity sensors, which may otherwise be referred to as sensor modules, may be located on the robotic platform for tracking its position and orientation along a plane in two dimensional space. In other embodiments, three non-contact velocity sensors may be located on the robotic platform to track its position and orientation in three dimensional space.

The sensor modules may be configured to include laser self-mixing interferometers, in which a laser beam is reflected from a surface of an object and back towards the laser beam. By way of example only, each of the laser self-mixing interferometers on a sensor module may be equipped to measure the modulation in the intensity of the laser beam produced by the interference of the emitted laser beam. Tracking the robotic platform's movement can be determined by the changes of the frequency of the reflected light, known as the Doppler frequency shift. The interference between the emitted light from a coherent light source and the reflected light with shifted frequency produces periodic variations of the laser intensity that may be determined as a beat frequency. With the use of the self-mixing interferometer, a laser beam is reflected from an object and is collected at the cavity of the laser. The received reflected beam is amplified within the laser cavity and interferes with the light waves being generated in the laser cavity. This interference results in a modulation of the light's intensity with the beat frequency. The beat signal can be used to measure the velocity, V, of the robotic platform. The relationship between the Doppler frequency shift and platform velocity is:

$$f_D = \frac{2V\cos\varphi}{\lambda} \quad (1)$$

where $f_D$ is the Doppler frequency shift, V is the robotic platform's velocity, $\varphi$ is the angle between the vector of the robotic platform's velocity and the direction of light emitted by the laser, and $\lambda$ is the light wavelength.

Figure 1:
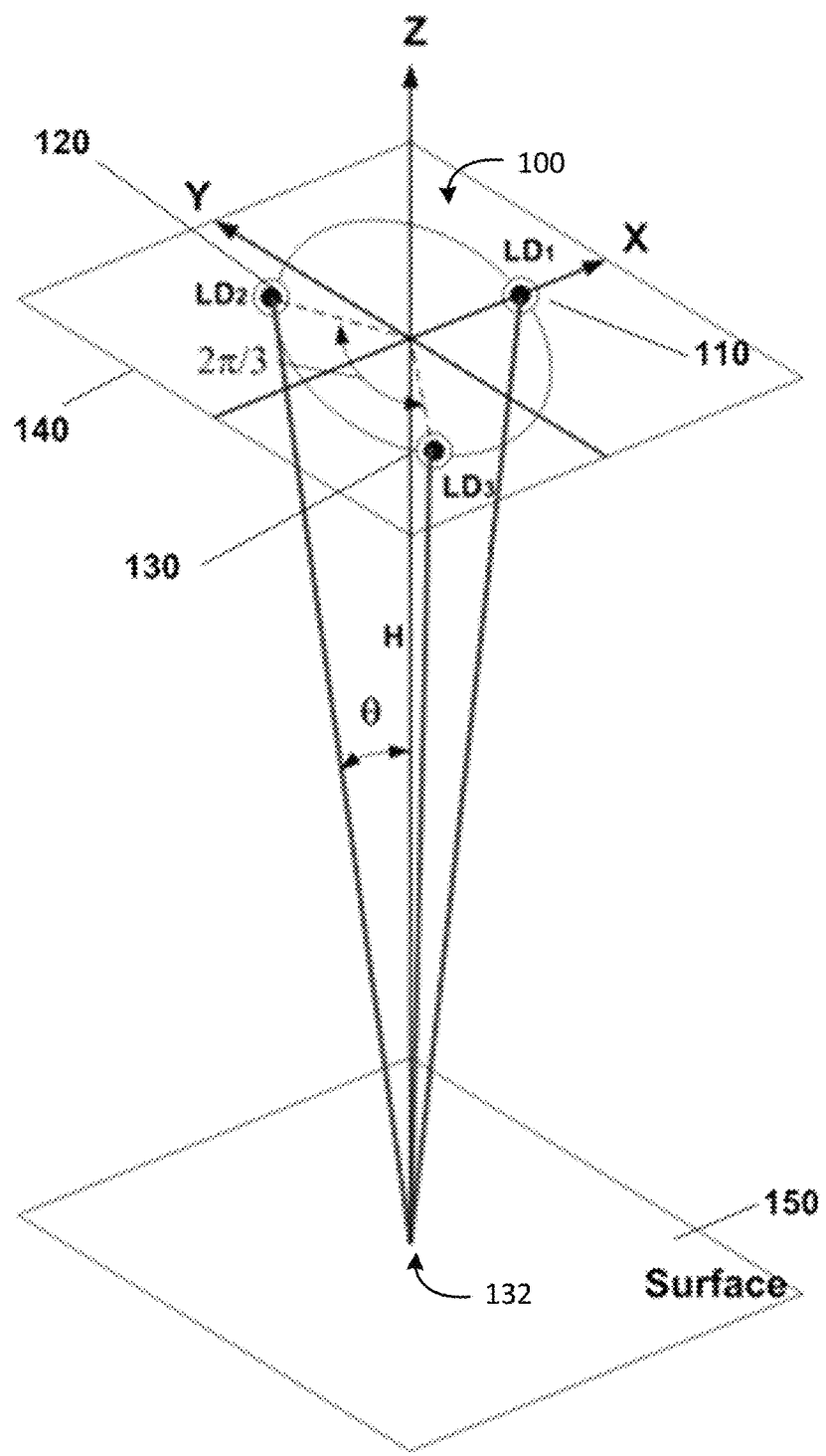
FIG. 1 illustrates a sensor module with three self-mixing laser interferometers according to one embodiment of the present disclosure.

FIG. 1 illustrates an example sensor module 100 with three self-mixing laser interferometers 110, 120, 130 according to one embodiment of the present disclosure. As depicted in this example, the sensor module 100 may include three laser self-mixing interferometers 110, 120, 130 located on a base plane 140 of the sensor module 100. In some instances, the three laser self-mixing interferometers 110, 120, 130 are equally spaced from one another so as to create an equilateral triangle configuration on the base plane 140 with each inclined to the plane normal at an established θ. This allows the emitted laser beams to create an inverted pyramid having an apex at the reflection point 132 on the target surface 150.

Thus, the three laser self-mixing interferometers 110, 120, 130 may each emit a laser beam to the target surface 150, so that the laser beam emitted by each self-mixing interferometer is reflected back into its laser cavity. As discussed above, based on the changes in frequency of the reflected laser beam, the Doppler frequency shifts is then measured. In some embodiments, the frequencies identified by each laser self-mixing interferometers 110, 120, 130 is averaged over several measurement cycles to reduce the data noise and to improve the accuracy of the determined changes in frequency of the reflected laser beams.

With the determined Doppler frequency shifts attained from the laser self-mixing interferometers 110, 120, 130, the local velocity vector in a platform coordinate system may be calculated by the onboard computer system on the robotic platform in communication with the sensor module 100. In the embodiment shown on FIG. 1, to determine the local velocity vector as measured by the sensor module 100, the following is determined:

$$V_x = \frac{2}{3\sin\theta}\left[F_{D1} - \frac{F_{D2} + F_{D3}}{2}\right]\frac{\lambda}{2}, V_y = \frac{F_{D2} - F_{D3}}{\sqrt{3}\sin\theta}\frac{\lambda}{2}, \quad (2)$$

$$V_z = \frac{F_{D1} + F_{D2} + F_{D3}}{3\cos\theta}\frac{\lambda}{2}$$

Figure 2:
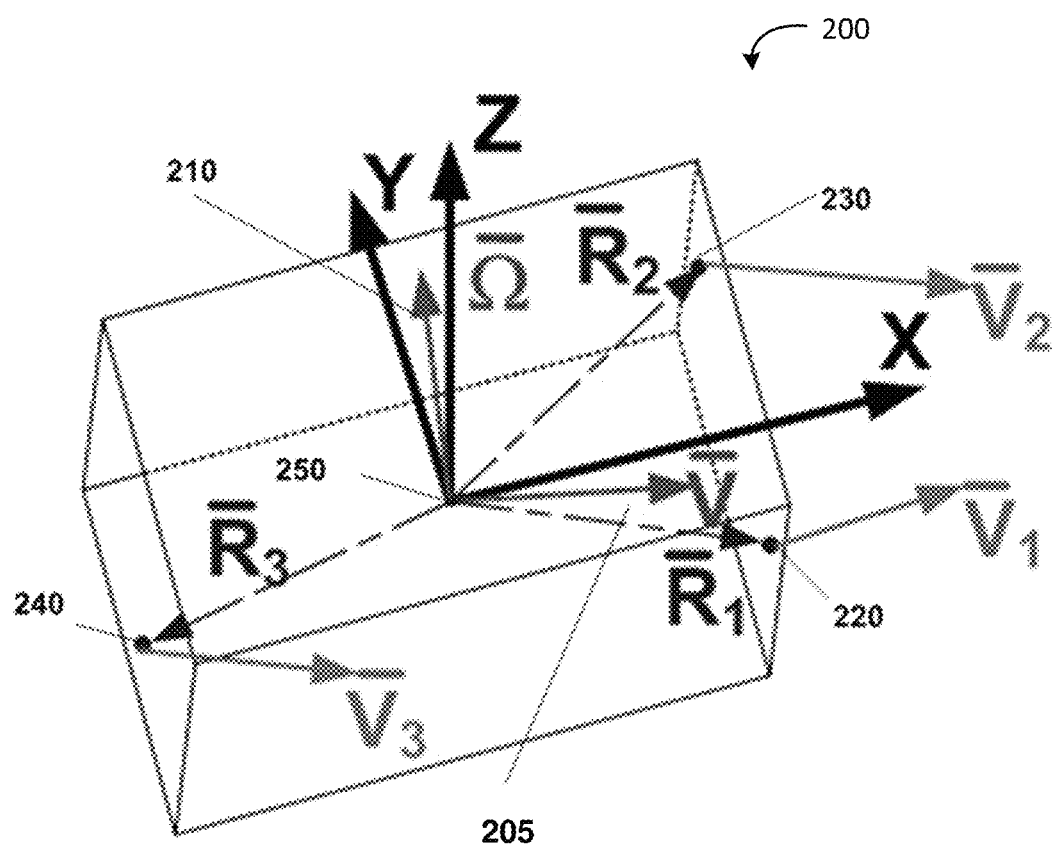
FIG. 2 illustrates a moving robotic platform with six degrees of freedom according to one embodiment of the present disclosure.

FIG. 2 illustrates an example of a moving robotic platform 200 with six degrees of freedom. The robotic platform 200 may be fixed onto a rigid mechanical body configured to operate various data collecting tasks while withstanding various harsh environmental conditions. By way of example only, where the robotic platform 200 is configured to roam the surface of extraterrestrial planets in our solar system, the robotic platform 200 may be configured to operate with at least six degrees of freedom in three-dimensional space so that it may accomplish the various data gathering tasks, such as exploring various craters of interest. In such instances, the robotic platform 200 may be enable to change its position forward/backward, up/down, and left/right, as well as its orientation, often termed pitch, yaw, and roll. The movement of the robotic platform 200 is illustrated at points 220, 230, and 240, where the sensor module are located by way of example only.

Because the robotic platform 200 may be capable of movement with six degrees of freedom, its movement may be adequately described by the use of two vectors; the vector of center of mass velocity $\vec{V}$ 205 and the rotation vector $\vec{\Omega}$ 210. Thus, the movement of the robotic platform 200 where the sensor modules 220, 230, 240 are located can be described as:

$$\vec{V}_i = \vec{V} + \vec{\Omega} \times \vec{R}_i \quad (3)$$

where $\vec{R}_i$ (i=1,2,3) are the vectors of the locations of the sensor modules 220, 230, 240 in body coordinates with respect to the center of mass 250 of the robotic platform 220. The location of the sensor modules 220, 230, 240 may be selected in such a way that vectors $\vec{R}_i$ are not coplanar.

Next, the rotation vector $\vec{\Omega}$ 210 can be determined from the set of difference equations when all three vectors $\vec{R}_i$ are not located on the same plane:

$$\vec{V}_1 - \vec{V}_2 = \vec{\Omega} \times (\vec{R}_1 - \vec{R}_2)$$

$$\vec{V}_2 - \vec{V}_3 = \vec{\Omega} \times (\vec{R}_2 - \vec{R}_3) \quad (4)$$

This allows the positioning of the robotic platform 200 to be determined. The displaced or second position of the moving robotic platform 200 can be found in global coordinates associated with planet coordinates as $\vec{r}^{k+1}$, which can be calculated as:

$$\vec{r}^{k+1} = \vec{r}^k + \vec{V} \cdot \Delta t \quad (5)$$

where $\vec{r}^k$ is the previous position of the robotic platform 200 and $\Delta t$ is the determined time interval between consecutive measurements of the robotic platform's 200 positioning. By way of example only, the time interval between consecutive measurements may be as short as 1 ms, which allows for almost instantaneous feedback in the movement and positioning of the robotic platform 200. However, it should be noted that the established time frame is not limited to 1 ms, and may range anywhere between <1 ms to several minutes. The selected time interval in the measurement cycle may depend on the selected need for movement/positioning updates of the robotic platform 200 and available computational power. Other factors may include the expected platform velocity, distance to be travelled, and range of motion of the robotic platform 200. Thus, where the control user seeks to instantaneously receive changes in the positioning of the robotic platform 200, the updated time frame may be closer to 1 ms or less.

Additionally, in some embodiments, the determination of the orientation of the robotic platform 200 can be found. Formally, the use of the Matrix $A_{ij}^k$ can be utilized to describe the orientation of platform's unit vectors $\vec{x}_b^k$, $\vec{y}_b^k$, and $\vec{z}_b^k$ in the global coordinates with unit vectors $\vec{x}_g$, $\vec{y}_g$, and $\vec{z}_g$. The orientation of the unit vectors may then be calculated in the global coordinates as:

$$\vec{x}_b^k = a_{11}^k \vec{x}_g + a_{12}^k \vec{y}_g + a_{13}^k \vec{z}_g$$

$$\vec{y}_b^k = a_{21}^k \vec{x}_g + a_{22}^k \vec{y}_g + a_{23}^k \vec{z}_g$$

$$\vec{z}_b^k = a_{31}^k \vec{x}_g + a_{32}^k \vec{y}_g + a_{33}^k \vec{z}_g \quad (6)$$

where the new vectors $\vec{x}_b^k$, $\vec{y}_b^k$, $\vec{z}_b^k$ can be calculated in the global coordinates as:

$$\vec{x}_b^{k+1} = \vec{x}_b^k + \vec{\Omega} \times \vec{x}_b^k \cdot \Delta t$$

$$\vec{y}_b^{k+1} = \vec{y}_b^k + \vec{\Omega} \times \vec{y}_b^k \cdot \Delta t$$

$$\vec{z}_b^k = z_b^k + \vec{\Omega} \times z_b^k \cdot \Delta t \quad (7)$$

After the vectors are normalized, the new matrix $A_{ij}^{k+1}$ can be compiled. This matrix describes the movement of the robotic platform 200 in global coordinates. The matrix $A_{ij}^{k+1}$ can be presented as a product of three matrices describing the rotations of the robotic platform 200 around the selected axis, or Euler parameters. Such rotational movement may be also determined as roll, pitch, and yaw angles, or otherwise known as Euler angles. Updating the position and orientation of the robotic platform may be performed consistently at the established time frame in the measurement cycle until a command is received from the onboard computer instructing the pause or end in data acquisition and its measurements or calculations.

Figure 3:
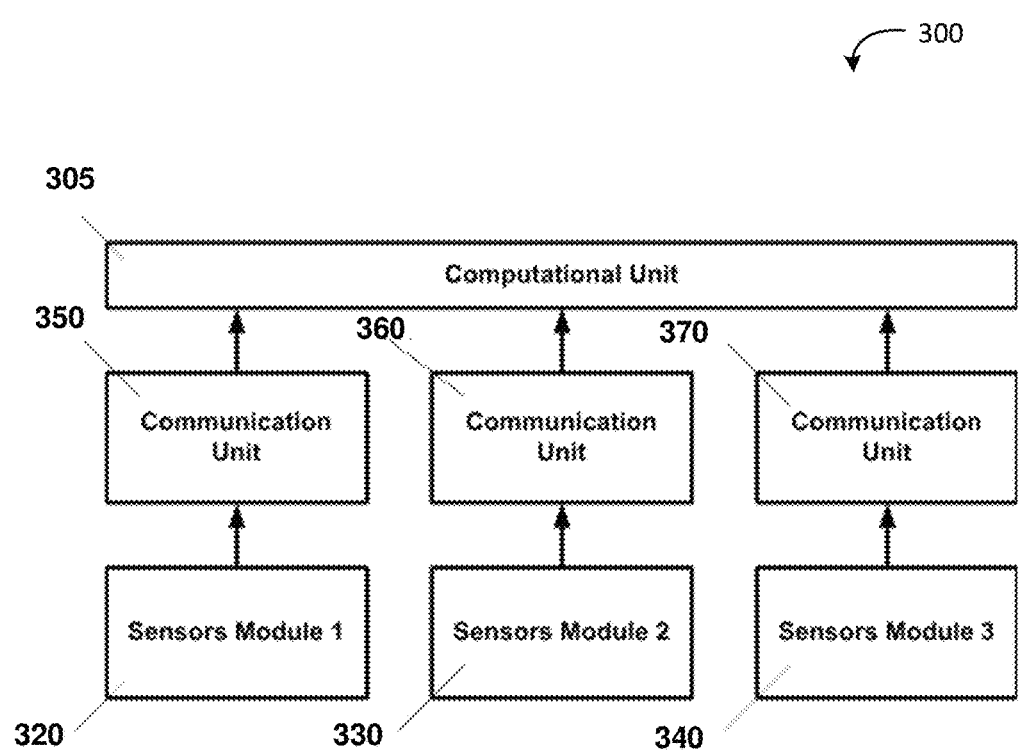
FIG. 3 illustrates a diagram of a navigating and tracking system for a robotic platform according to one embodiment of the present disclosure.

FIG. 3 illustrates an example of a diagram of a navigation and tracking system 300 of a robotic platform according to one embodiment of the present disclosure. The navigation and tracking system 300 may include 3 individual sensor modules 320, 330, 340 attached to a robotic platform. Each of the sensor modules 320, 330, 340 emits laser beams from the self-mixing interferometers on the sensor modules 320, 330, 340 to determine the robotic platform's position and orientation, as discussed with respect to FIG. 2 above.

The navigation and tracking system 300 also includes communication units 350, 360, 370 in connection with each of the sensor modules 320, 330, 340. This allows each of the data sets acquired from the sensor modules 320, 330, 340 to be collected and transferred to a computational unit 305. The computational unit 305 may be located within each or any of the sensor modules 320, 330, 340, or as a separate unit from the sensor modules 320, 330, 340. The computational unit 305 receives the data from each of the communication units 350, 360, 370 in connection with its respective sensor modules 320, 330, 340. From the data acquired, the computational unit 305 may determine the global coordinates of the robotic platform's position and orientation from the acquired Doppler frequency shifts of the emitted laser beams. In some instances, the navigation and tracking system 300 may also include a transceiver (not illustrated) as a separate unit from the robotic unit. By way of example only, the transceiver may be located at a command station at a remote location (e.g., on Earth in the example of the planetary exploration robot) and in communication with the robotic platform to receive the data collected. Based on the information and data received from the robotic platform via the transceiver, the user controlling the robotic platform at the command station may send modified or updated navigational instructions to the robotic platform, which may also be done via the transceiver.

Figure 4:
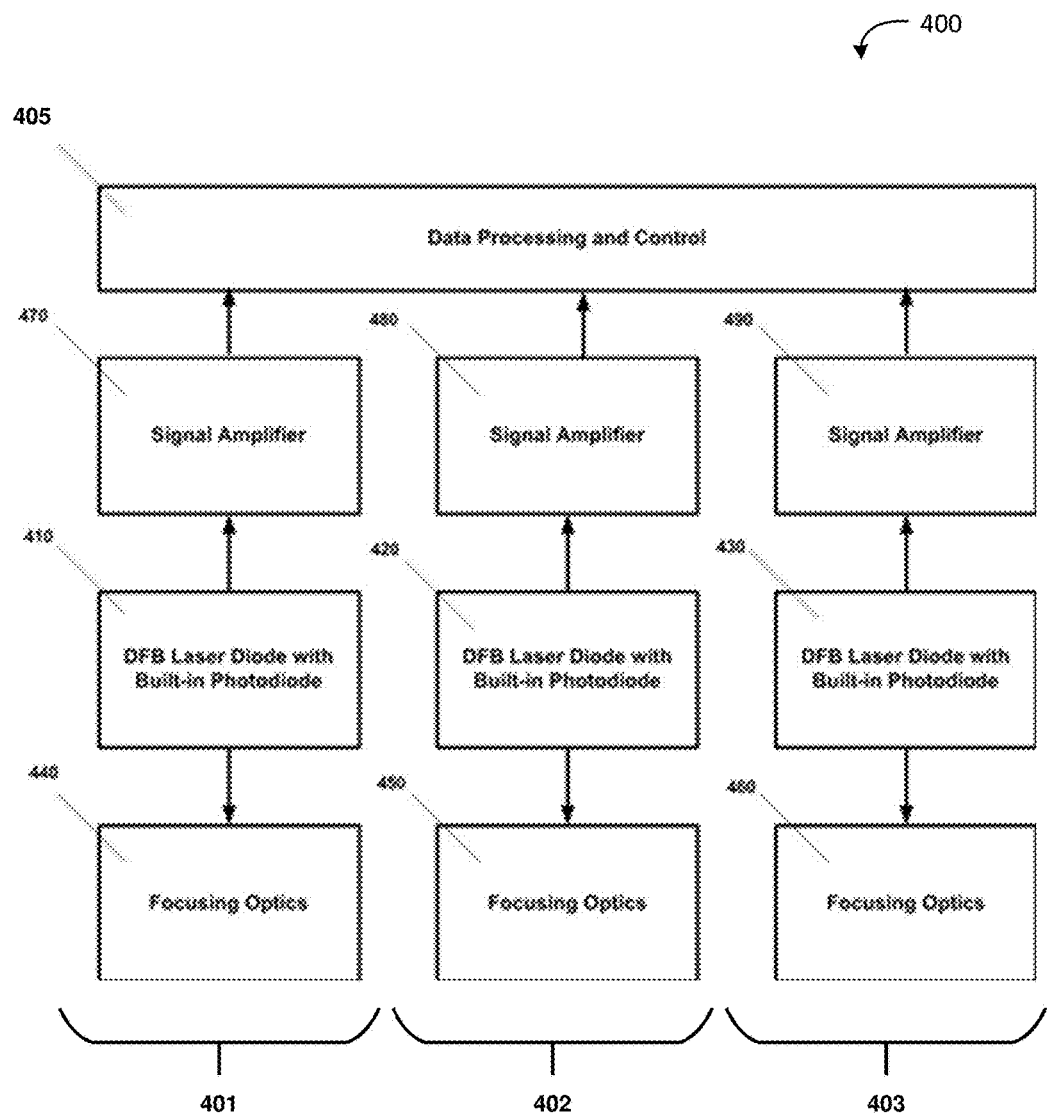
FIG. 4 illustrates a diagram of each sensory module for navigating and tracking a robotic platform according to one embodiment of the present disclosure.

FIG. 4 illustrates a diagram of example sensory modules 401, 402, 403 that may be included in a navigating and tracking a robotic platform according to one embodiment of the present disclosure. Each sensor module 401, 402, 403 in this example, may include three self-mixing interferometric sensors for measuring the Doppler frequency shifts of the laser beams emitted and reflected from a surface. In some instances, the lasers are used to generate the laser beams emitted from each of the three self-mixing interferometric sensors, which may include distributed feedback laser diodes (hereinafter DFB laser diodes") 410, 420, 430. DFB laser diodes are lasers in which the whole resonator comprises a periodic structure, which acts as a distributed reflector in the wavelength range of the generated laser beam. Because DFB laser diodes offer a single mode oscillation and a narrow spectral output, they are often characterized by an excellent coherence of emitted light, which facilitates the interference between the emitted light and the light reflected from the surface.

Additionally, to further enhance the interference between the emitted and reflected beams, the sensor modules 401, 402, 403 may contain focusing optics 440, 450, 460. The focusing optics 440, 450, 460 may include a conventional focusing lens or a more complex autofocusing optical system, as would be appreciated by any person of ordinary skill in the art upon reading this invention. By way of example only, the focusing optics 440, 450, 460 may be aspheric lenses which are commonly used for collimating or focusing divergent laser beams emitted by laser diodes. Aspheric lenses reduce spherical aberration, thus providing smaller sizes of focused spots.

Furthermore, the focusing optics 440, 450, 460 may use an autofocus optical system with a motor/tunable optical element. The autofocus optical system may be configured to keep the laser beams focused on the reflecting surface. The continuous focusing laser beams on the reflecting surface facilitates the strong interference between emitted and reflected laser beams. Because the reflecting surface can have complex unknown surface profiles (rocks, cracks, etc.), the operation of the autofocus system improves the reliability and determination of the platform velocity relative to the surface, as well as the accuracy of tracking platform positions and its orientation.

Each of the sensor modules 401, 402, 403 may each also include signal amplifiers 470, 480, 490. The signal amplifiers 470, 480, 490 may be configured to boost the interference signal obtained from the sensor modules 401, 402, 403. By way of example only, the signal amplifiers 470, 480, 490 may be implemented as transimpedance amplifiers to amplify the beat signals from the DFB laser diodes. The number of beats per the established period of measurements may be counted by digital counters and sent to the processing system 405 for data processing and control to determine the robotic platform's position and orientation. This can be done, for example, as described in conjunction with the algorithms described above. Once the data has been processed and calculated, the determined trajectory of the robotic platform may be displayed in real time on XY and XZ planes for viewing purposes.

Figure 5:
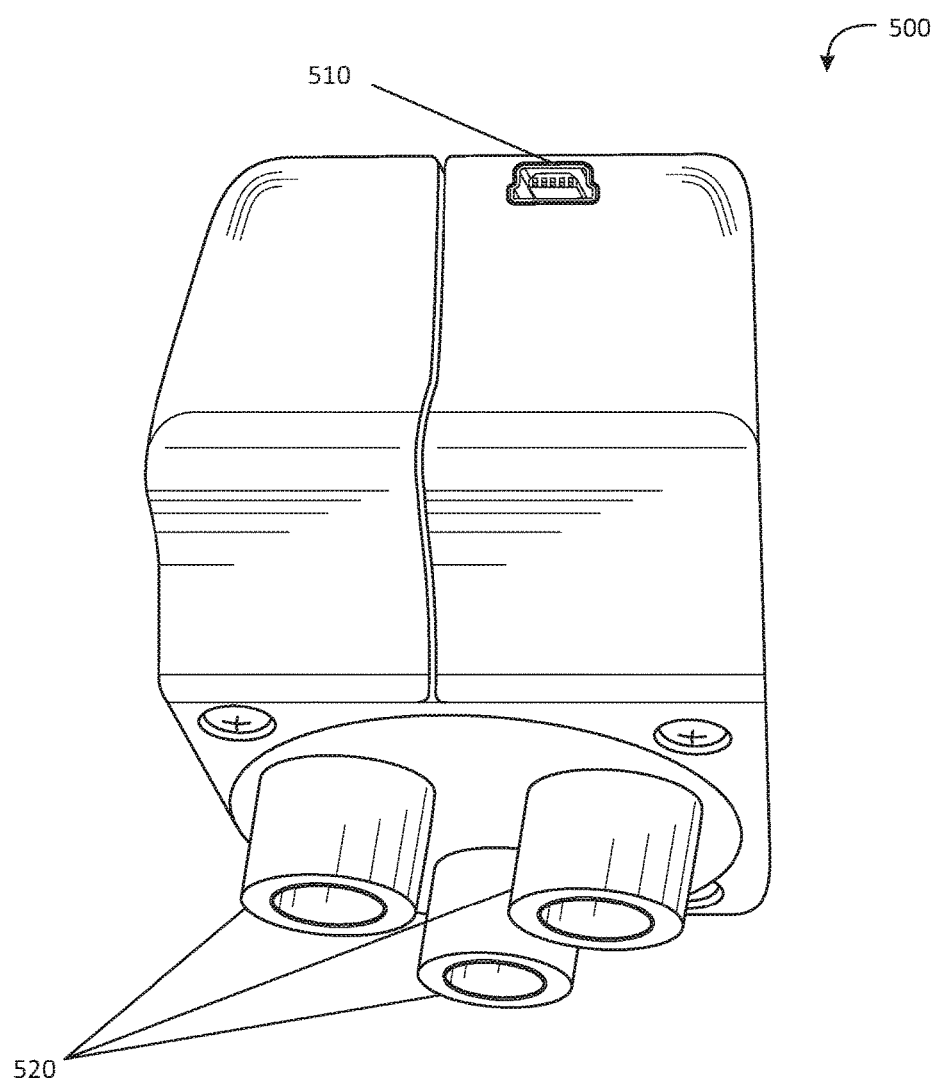
FIG. 5 illustrates an exemplary sensor module to be installed on a robotic platform according to one embodiment of the present disclosure.

FIG. 5 illustrates an exemplary sensor module 500 to be installed on a robotic platform according to one embodiment of the present disclosure. In some embodiments, the sensor module 500 may have an Universal Serial Bus (hereinafter "USB") socket 510 for establishing a connection with another external device, such as an onboard computer on the robotic platform. This may allow the sensor module 500 to be in direct communication with the onboard computer or any other computing portable device with a USB socket. This allows data to be collected from the sensor module 500 and transferred to the attached computer, so that the acquired data may be used to measure and calculate the position and orientation of the robotic platform. Additionally, in other embodiments, the USB socket may be used to connect to a power supply, so as to provide a steady flow of power to the sensor module 500.

The sensor module 500 also includes three self-mixing interferometric sensors 520. By way of example only, the sensor module 500 may have three self-mixing interferometric sensors that utilize DFB laser diodes. Additionally, the placement of the three interferometric sensors 520 may be equally spaced apart from one another, so as to create a triangle shape in placement. The three interferometric sensors 520 may also be installed with a small angle inclination with respect to the vertical axis. For example, the angle may range anywhere from 0.1 to 10 degrees (although other angles are possible), which allows the emitted laser beams from the interferometric sensors 520 to create an inverted pyramid with its apex at the reflection point on a surface of an object.

Figure 6:
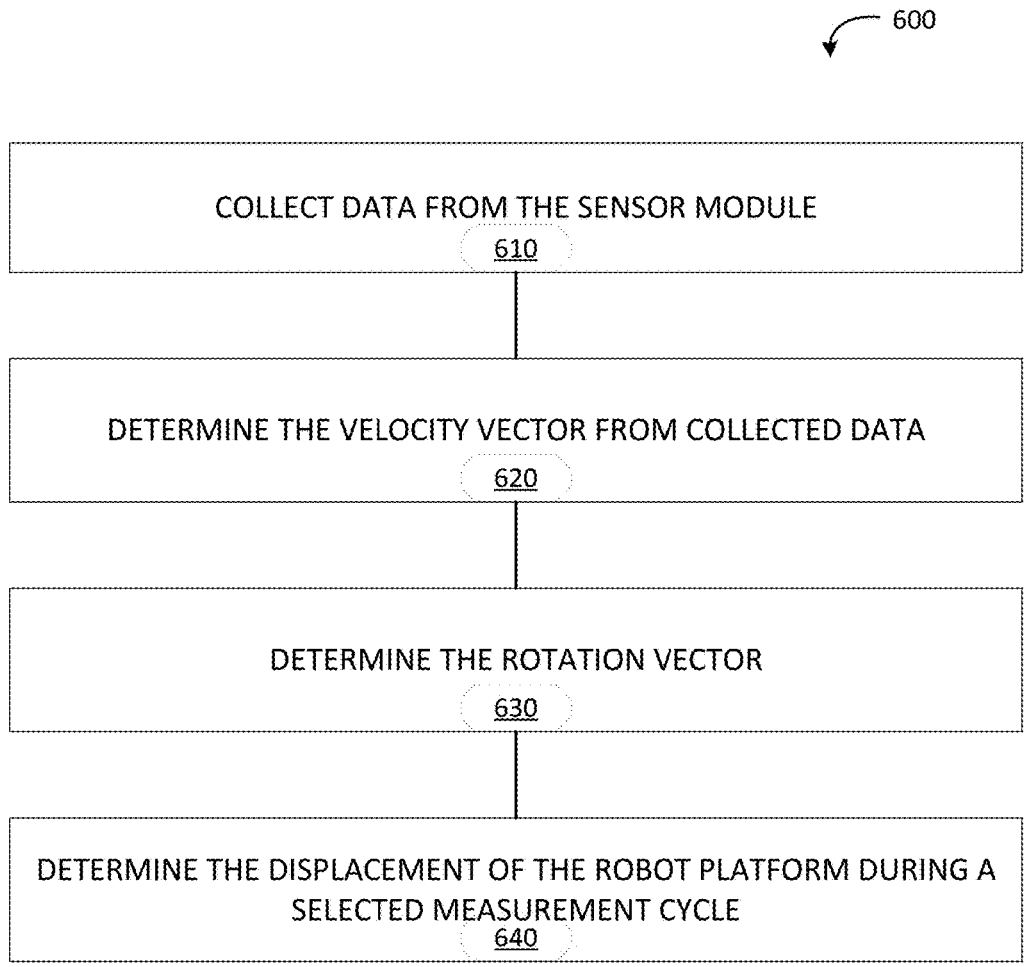
FIG. 6 illustrates a flow chart of an exemplary process for determining a position and orientation of a robotic platform.

FIG. 6 presents a flow chart illustrating an exemplary process 600 for determining a position and orientation of a robotic platform. The exemplary process begins at operation 610 by collecting data from sensor modules located on the robotic platform. Consider an example in which there are a total of three sensor modules located on the robotic platform.

Further consider an example in which two of the three sensors may be located toward the front end of the robotic platform near the front two wheels and the third sensor module is located toward the back end of the robotic platform near the middle of the rear two wheels.

Each of the sensor modules has three self-mixing laser interferometers, resulting in a total of 9 velocity sensors on the robotic platform. The three self-mixing laser interferometers on each sensor module may be positioned equidistantly from one another in the shape of an equilateral triangle, where each sensor module may meet to create an inverted pyramid with the apex at a reflection point on a target surface. An example of this is shown at FIG. 1.

The exemplary process 600 may proceed to operation 620, where the velocity of the robotic platform is calculated by determining the velocity vector from the data collected with each of the sensor modules. In some instances, the sensor modules may measure the Doppler frequency shifts from each of the sensor modules by emitting and reflecting a light source and collecting a small portion of the light reflected (e.g., diffusely reflected) from the reflecting surface. When some of the light emitted from the light source is scattered or reflected from the surface and re-enters the diode cavity of the sensor module, the reflected light interferes with the oscillating light waves inside the cavity, leading to modulation of the emitted light's intensity. If the object is moving relative to the laser, the collected light in the diode cavity will produce a beat signal in the difference in frequencies with the light emitted from the light source. The beat signal can be used to measure the velocity of the robotic platform, based on the relationship with the determined Doppler frequency shifts. The local velocity vector may be determined using formula (2) as presented above. This formula is derived for the specific modules coordinates shown on FIG. 1. The direction of the sensor module axes may be different from the platform coordinates, so the determined velocity vector has to be transformed to platform coordinates.

The exemplary process 600 may proceed to operation 630, where the robotic platform's rotational movement may be determined. By using the determined velocity vector calculated at operation 620, such values may be used to determine the robotic platform's rotation vector using formula (4) presented above.

Next, the displacement of the robotic platform may be determined at each selected time interval in a determined measurement cycle. In some instances, the time interval may be determined to be 1 ms or less, so that each new measurement of the robotic platform's velocity and rotation vector is determined every 1 ms or less. The displacement of the robotic platform's position and orientation may be determined in global coordinates. In some instances, the orientation may be presented as roll, pitch, and yaw angles. The measurement cycle to determine the robotic platform's displacement may be repeated continuously until a stop command is used.

Figure 7:
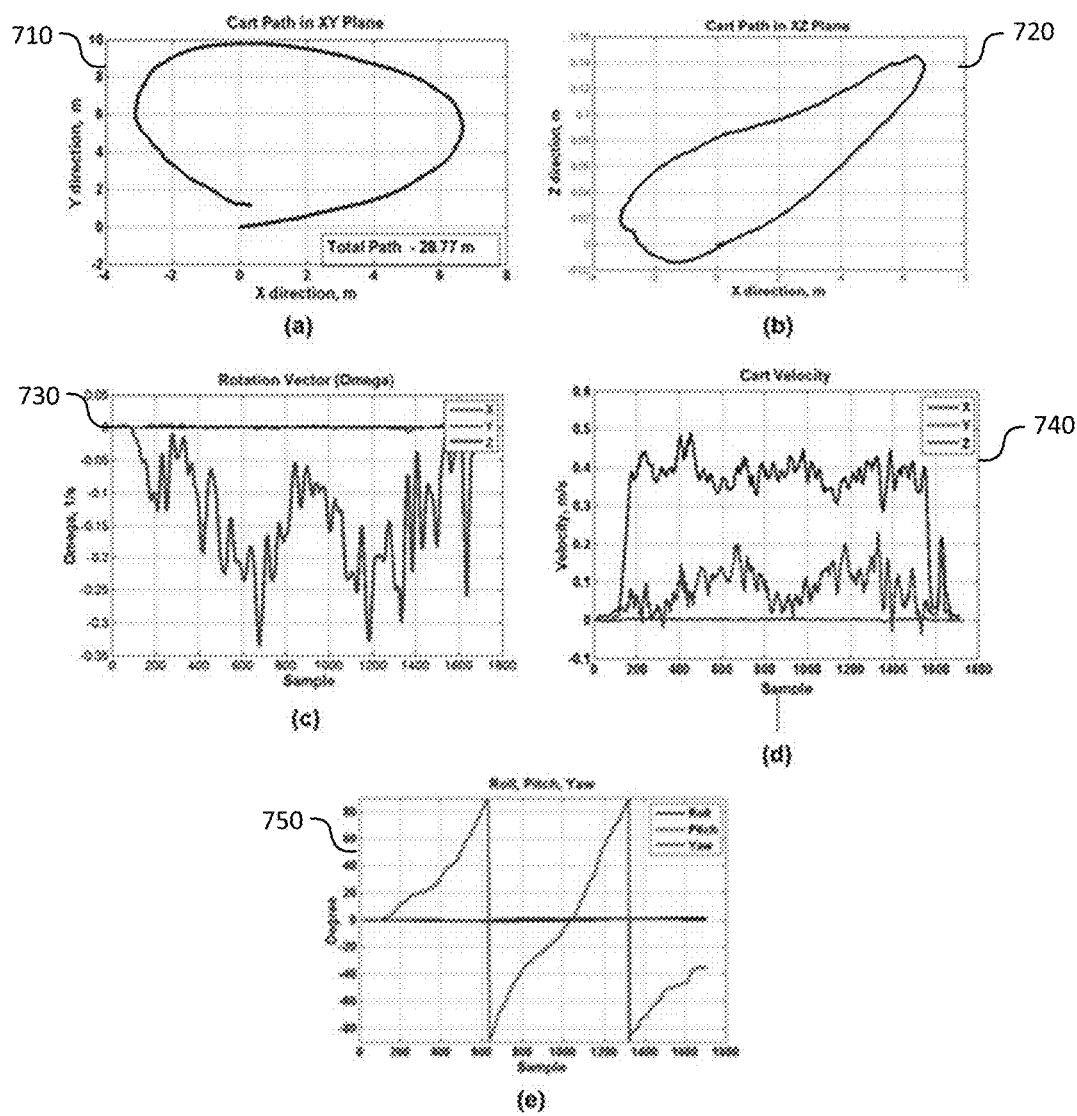
FIG. 7 illustrates a graphical representation of data collected from a sensory module depicting a robotic platform's position and navigation trajectory according to one embodiment of the present disclosure.

FIG. 7 illustrates an example of a graphical representation of data collected from a the sensory module depicting a robotic platform's position and navigation trajectory according to one embodiment of the present disclosure. While a computational unit or an onboard computer on the robotic platform may calculate the gathered data to determine the robotic platform's position and orientation, it is helpful to view the gathered data in a visual manner. As illustrated, graphical representation 710 depicts the measured and calculated data of the robotic platform's positions traveled along the XY plane. The same traveled path may also be represented in a two dimensional graphical representation along the XZ plane, as depicted in representation 720. The graphical representations of both 710 and 720 when viewed together, allows the viewer to determine and assess the robotic platform's travelled trajectory in a three dimensional environment on a two dimensional chart based on the received data measured by the sensor modules on the robotic platform.

In other embodiments, graphical representation 730 depicts data of the robotic platform's rotation vector, Ω, measured during the movement of the robotic platform. In some embodiments, the graphical representation 730 may include the data points collected along the X, Y, and Z axis, which gives the viewer a three dimensional perspective of the robotic platform's rotational movement.

In other embodiments, the graphical representation 740 depicts measured components of a robotic platform's velocity vector, V. Here, the graphical representation 740 may also include the data points collected at the X, Y, and Z axis, thus giving the viewer a three dimensional perspective of the robotic platform's determined velocity based on the data collected from the sensor modules on the robotic platform.

Additionally, the graphical representation 750 depicts measured data points that display the roll, pitch, and yaw angles of the robotic platform's experienced rotational motion. Different indicators may represent the roll, pitch, and yaw data so that a viewer may easily differentiate and determine the roll, pitch, and yaw points respectively.

Figure 8:
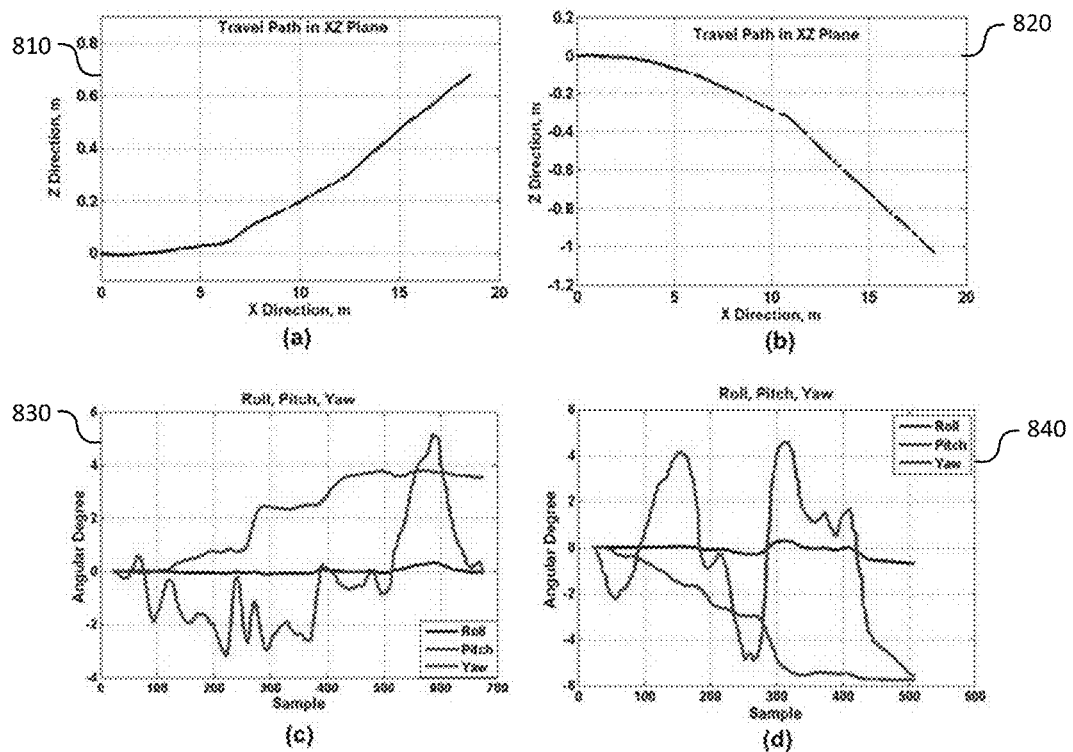
FIG. 8 illustrates a graphical representation of data collected from a sensory module depicting a robotic platform's movement along an angled surface according to one embodiment of the present disclosure.

FIG. 8 illustrates an example of a graphical representation of data collected from a sensory module depicting a robotic platform's movement on an angled surface according to one embodiment of the present disclosure. Furthermore, it may be more helpful to the viewer if the graphical information were to display the terrain information causing the type of movement and motion experienced by the robotic platform. By way of example only, the graphical representations may display when the robotic platform is driving in a uphill or downhill trajectory, which is depicted in graphical representations 810 and 820 respectively. Thus a positive slope at 810 indicates that the robotic platform is moving uphill while the negative slope at 820 indicates that the robotic platform is moving downhill. This gives the viewer graphical illustrations with more information as to the travelled trajectory and terrain of the robotic platform.

Additionally, in further embodiments, the roll, pitch, and yaw angle data collected from the sensor modules may also be displayed on graphical representations 830, 840 as the robotic platform may be travelling uphill or downhill. Graphical representation at 830 shows that the robotic platform is moving uphill from a flat surface, as indicated by the positive slope in the pitch angle. However, graphical representation 840 shows that the robotic platform is moving downhill from a flat surface, as indicated by the negative slope in the pitch angle.

Figure 9:
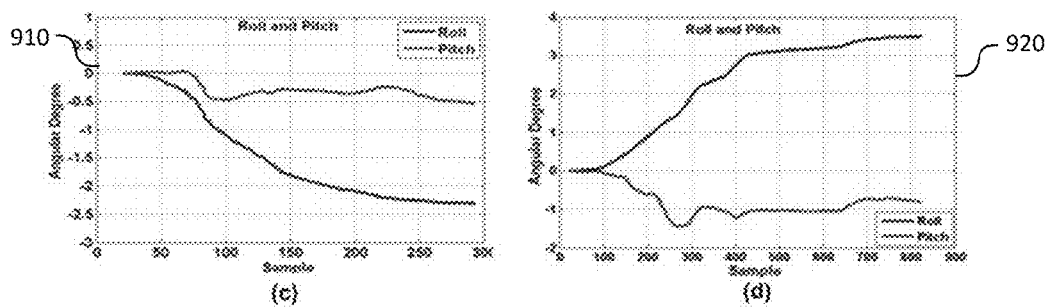
FIG. 9 illustrates a graphical representation of data collected from a sensory module depicting a robotic platform's movement according to one embodiment of the present disclosure.

FIG. 9 illustrates a graphical representation of data collected from a sensor module depicting a robotic platform's movement at a tilted position according to one embodiment of the present disclosure. In some embodiments, the graphical representation may depict instances where the robotic platform becomes titled due to the environmental conditions and the terrain, such as when travelling over rocks and rugged terrain. For example, graphical representation 910 depicts the collected roll and pitch angles during the robotic platform's movement from a flat surface, where the angular degree is zero, to a titled position where the robotic platform is tilted to the left, as indicated by the negative slope in the roll angle data. Additionally, graphical representation 920 shows instances where the data collected depicts the robotic platform's movement from a flat surface, where the angular degree is zero, to a tilted position where the robotic platform is tilted to the right, as indicated by the positive slope of the roll angle data.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A robotic platform comprising:
a non-contact velocity sensor set positioned on the robotic platform for measuring local velocities of the robotic platform relative to a target surface;
a communication unit for transmitting data collected from the non-contact velocity sensor set to a computer for data processing; and
a computer for processing data collected from the non-contact velocity sensor set;
wherein the non-contact velocity sensor set comprises a coherent light source that is emitted towards the target surface and reflected back to the coherent light source, wherein the non-contact velocity sensor set measures Doppler frequency shifts of the reflected coherent light source to determine local velocities of the robotic platform relative to the target surface.

2. The robotic platform of claim 1, wherein the non-contact velocity sensor set comprises a first non-contact velocity sensor, a second non-contact velocity sensor, and a third non-contact velocity sensor where vectors of the first non-contact velocity sensor, the second non-contact velocity sensor, and the third non-contact velocity sensor are not coplanar.

3. The robotic platform of claim 2, wherein the first non-contact velocity sensor, the second non-contact velocity sensor, and the third non-contact velocity sensor each comprises a set of laser self-mixing interferometers.

4. The robotic platform of claim 3, wherein the set of laser self-mixing interferometers comprises three laser self-mixing interferometers.

5. The robotic platform of claim 4, wherein the three laser self-mixing interferometers on each of the first non-contact velocity sensor, the second non-contact velocity sensor, and the third non-contact velocity sensor are equally spaced apart in a plane and inclined at a same angle such that each laser beam from the three laser self-mixing interferometers is focused at a same point on the target surface.

6. The robotic platform of claim 4, wherein the three laser self-mixing interferometers further comprise an auto focusing mechanism to maintain focus of the laser beams on the target surface.

7. The robotic platform of claim 1, wherein the local velocities of the robotic platform are used to determine an orientation of the robotic platform as roll, pitch, and yaw angles.

8. The robotic platform of claim 7, wherein the velocity and the orientation of the robotic platform are determined at a select time interval that is continuously repeated until a command is issued from the computer.

9. A method for tracking a robotic platform comprising:
obtaining a robotic platform comprising:
a non-contact velocity sensor set for measuring local velocities of the robotic platform relative to a target surface;
a communication unit for transmitting data collected from the non-contact velocity sensor for data processing; and
a computer for processing data collected from the non-contact velocity sensor set;
emitting laser beams from the non-contact velocity sensor to the target surface;
collecting reflected laser beams from the target surface, where the reflected laser beams enters a diode laser cavity of the non-contact velocity sensor from which it was emitted to determine a position and an orientation of the robotic platform based on a change in intensity of the laser beams; and
determining a velocity vector of the robotic platform based on a measured frequency of the change in intensity of the laser beams.

10. The method for tracking a robotic platform of claim 9, wherein the non-contact velocity sensor set comprises of a first non-contact velocity sensor, a second non-contact velocity sensor, and a third non-contact velocity sensor, where vectors of the first non-contact velocity sensor, the second non-contact velocity sensor, and the third non-contact velocity sensor are not coplanar.

11. The method for tracking a robotic platform of claim 10, wherein the first non-contact velocity sensor, the second non-contact velocity sensor, and the third non-contact velocity sensor each comprises three laser self-mixing interferometers.

12. The method for tracking a robotic platform of claim 9, further comprising averaging the beat frequencies determined by each non-contact velocity sensor over several measurements cycles to reduce data noise and improve accuracy of the position and the orientation of the robotic platform.

13. The method for tracking a robotic platform of claim 12, further comprising determining a variation of an initial position of the robotic platform by calculating a rotation vector and a velocity vector of the robotic platform in global coordinates at a first time interval of a measurement cycle, such that the changes in the initial platform and its orientation are determined over a span of the measurement cycle.

14. The method for tracking a robotic platform of claim 13, further comprising determining a second position of the robotic platform based on the rotation vector and the velocity vector of the robotic platform in global coordinates at a second time interval of the measurement cycle.

15. The method for tracking a robotic platform of claim 14, further comprising determining a roll angle, pitch angle, and a yaw angle of the robotic platform in global coordinates.

16. A tracking system comprising:
a robotic platform comprising:
a non-contact velocity sensor set comprising a first non-contact velocity sensor, a second non-contact velocity sensor, and a third non-contact velocity sensor each positioned on the robotic platform for measuring local velocities of the robotic platform relative to a target surface;
a computer for processing data collected from the non-contact velocity sensor set to determine a position and orientation of the robotic platform at each selected time interval determined by the velocity measured; and a communication unit for transmitting data collected from the non-contact velocity sensor to the computer for data processing;

wherein the non-contact velocity sensor set comprises laser interferometers utilizing laser beams reflected from the target surface to determine the velocity of the robotic platform by measuring frequencies of modulation of light intensities produced by the interferences of the reflected laser beams with incident beams; and a transceiver for communicating with the robotic platform to receive data collected from the non-contact velocity sensor set to monitor a trajectory path of the robotic platform and transmit navigation instructions to the robotic platform.

17. The tracking system of claim 16, wherein the local velocities of the robotic platform are determined by modulation frequencies of light intensities to determine the position of the robotic platform in global coordinates and the orientation of the robotic platform as roll, pitch, and yaw angles.

18. The tracking system of claim 17, wherein the three laser self-mixing interferometers on each of the first non-contact velocity sensor, the second non-contact velocity sensor, and the third non-contact velocity sensor are equally spaced apart from each other in the modulo a plane and inclined at a same angle, such that each laser beam from the three laser self-mixing interferometers is focused at a same point on the target surface.

19. A robotic platform comprising:
a non-contact velocity sensor set positioned on the robotic platform for measuring local velocities of the robotic platform relative to a target surface;
a communication unit for transmitting data collected from the non-contact velocity sensor set to a computer for data processing; and a computer for processing data collected from the non-contact velocity sensor set;

wherein the non-contact velocity sensor set comprises a coherent light source that is emitted towards the target surface and reflected back to the coherent light source;

a first non-contact velocity sensor, a second non-contact velocity sensor, and a third non-contact velocity sensor where vectors of the first non-contact velocity sensor, the second non-contact velocity sensor, and the third non-contact velocity sensor are not coplanar;

wherein the first non-contact velocity sensor, the second non-contact velocity sensor, and the third non-contact velocity sensor each comprises a set of laser self-mixing interferometers;

wherein the set of laser self-mixing interferometers comprises three laser self-mixing interferometers; and wherein the three laser self-mixing interferometers on each of the first non-contact velocity sensor, the second non-contact velocity sensor, and the third non-contact velocity sensor are equally spaced apart in a plane and inclined at a same angle such that each laser beam from the three laser self-mixing interferometers is focused at a same point on the target surface.

20. The robotic platform of claim 19, wherein the three laser self-mixing interferometers further comprise an auto focusing mechanism to maintain focus of the laser beams on the target surface.

21. The robotic platform of claim 19, wherein the local velocities of the robotic platform are used to determine an orientation of the robotic platform as roll, pitch, and yaw angles.

22. The robotic platform of claim 21, wherein the velocity and the orientation of the robotic platform are determined at a select time interval that is continuously repeated until a command is issued from the computer.

* * * * *